United States Patent [19]

Griffis

[11] Patent Number: 4,793,836
[45] Date of Patent: * Dec. 27, 1988

[54] REMOTE CONTROL FOR AN AIR FILTRATION SYSTEM

[76] Inventor: Steven C. Griffis, 2929 Avenue D, Council Bluffs, Iowa 51501

[*] Notice: The portion of the term of this patent subsequent to Nov. 10, 2004 has been disclaimed.

[21] Appl. No.: 177,422

[22] Filed: Apr. 4, 1988

Related U.S. Application Data

[63] Continuation-in-part of Ser. No. 072,044, Jul. 10, 1987, Pat. No. 4,750,922.

[51] Int. Cl.⁴ .................................................. B01D 46/02
[52] U.S. Cl. ............................ 55/210; 55/272; 55/274; 55/385.2
[58] Field of Search .................. 55/210, 213, 217, 272, 55/274, 97, 385 A

[56] References Cited

U.S. PATENT DOCUMENTS

| | | | |
|---|---|---|---|
| 4,121,199 | 10/1978 | Young | 55/274 X |
| 4,477,263 | 10/1984 | Shaver et al. | 55/385 A X |
| 4,604,111 | 8/1986 | Nafale | 55/97 |
| 4,701,195 | 10/1987 | Rosendall | 55/385 A X |
| 4,750,922 | 6/1988 | Griffis | 55/210 |

Primary Examiner—Charles Hart
Attorney, Agent, or Firm—Zarley, McKee, Thomte, Voorhees & Sease

[57] ABSTRACT

A remote control and monitor panel is operatively connected to an air filtration unit located within an enclosed contaminated space. The remote control and monitoring panel is located outside of the enclosed contaminated space so that the air filtration unit may be controlled and monitored without the necessity of entering the enclosed contaminated space where the filtration unit is located.

1 Claim, 3 Drawing Sheets

4,793,836

REMOTE CONTROL FOR AN AIR FILTRATION SYSTEM

CROSS-REFERENCE TO RELATED APPLICATION

This is a continuation-in-part application of Ser. No. 072,044 filed July 10, 1987 U.S. Pat. No. 4,750,922 entitled "Remote Control For An Air Filtration System."

BACKGROUND OF THE INVENTION

In the early 1940's, asbestos was an inexpensive material which was used in virtually every industrial plant across the nation because of its superior capabilities of noise reduction, insulating and fire retardant qualities. Asbestos was used in cement asbestos pipe, plaster, wiring, pipe insulation, sound absorbing tiles, floor tiles and sprayed on ceiling structural steel and deck pans.

Asbestos has been found to be a health hazard and asbestos removal or abatement programs are being conducted to remove these health hazards. Many regulations have been adopted and are in place to ensure the safety of those workers who are removing the asbestos as well as to ensure that the asbestos being removed will not be introduced into the surrounding atmosphere. For example, U.S. Pat. No. 4,604,111 describes a fairly common system which is employed in an asbestos removal project. In most projects, an enclosure is created around the space in which the asbestos is to be removed. The space is sealed by means of plastic sheets or the like. An air inlet is provided for the enclosed space to permit air to be drawn thereinto. A filtration unit such as the Model MT-3 of Micro-Trap, Inc. of Maple Shade, N.J. or the Model ST2000 of Global Consumer Services, Inc. of Los Angeles, Calif. is employed with each of the units having an air inlet and an air outlet. The air outlet of the filtration unit is placed in communication with the area outside of the enclosed space. A blower means is provided in the filtration unit so that the contaminated air in the enclosed space will be drawn through the filtration unit with the asbestos fibers being collected in the filtration unit. The filtration units are sometimes referred to as negative air systems so that air is drawn through the air inlet formed in the wall means and through the filtration unit.

A worker must normally pass through a clean room, a shower room and an equipment room before entering the contaminated area. When leaving the contaminated area, the worker will remove his contaminated clothing in the equipment room, enter the shower room, shower, and enter the clean room to put on clean clothing.

The filtration units are normally continually operated even though workers are not in the contaminated area. The filtration units include operating controls for controlling the operation of the filtration unit as well as monitors which monitor the operation of the filtration unit.

If the filtration unit should shut off or malfunction during non-working hours, a worker must enter the contaminated area through the clean room, shower room and equipment room to re-start the unit. The worker must then remove his clothing in the equipment room, shower in the shower room, enter the clean room, dress and exit. It is also necessary to periodically enter the contaminated area to monitor the operation of the filtration unit to ascertain that the filters are not clogged and that the unit is functioning satisfactorily. Such monitoring also requires the entry and exit procedure described hereinabove.

It is therefore a principal object of the invention to provide a remote control and monitoring means for an air filtration unit located within an enclosed contaminated area.

A further object of the invention is to provide a remote control and monitoring means for controlling the operation of an air filtration unit wherein the air filtration unit is located within a contaminated area permitting the control and operation of the filtration unit without the necessity of entering the contaminated area.

These and other objects will be apparent to those skilled in the art.

SUMMARY OF THE INVENTION

The area in which the asbestos is to be removed is first enclosed by either using the existing walls of the structure or by creating temporary walls. The walls are sealed to prevent the asbestos fibers from being discharged from the enclosed space. Outside are is permitted to enter the enclosed space through an air inlet. A filtration unit is positioned in the enclosed space and has an air inlet adapted to draw air into the filtration unit. The filtration unit has an air outlet which communicates with the space outside of the enclosed space. A remote control and monitoring means is operatively connected to the filtration unit and is located outwardly of the contaminated area preferably in the clean room so that the filtration unit may be controlled and monitored without the necessity of entering the contaminated area.

In a modified form of the invention, one or more of the air filtration units may have their exhausts operatively connected to an exhaust passing outwardly through the enclosure with one or more air filtration units simply being positioned within the enclosed contaminated area with their exhausts being in communication with the interior of the contaminated area. The remote control means may also be utilized to control those air filtration units which do not have their exhausts operatively connected to the exhaust opening in the enclosed space.

DESCRIPTION OF THE PREFERRED EMBODIMENT

Figure 1:
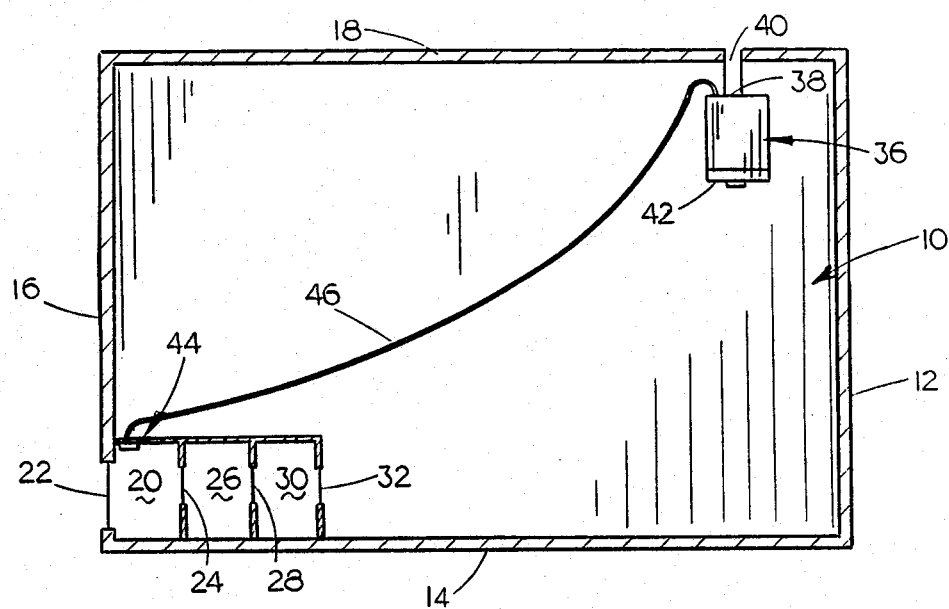
FIG. 1 is a floor plan illustrating the use of the apparatus of this invention.

In FIG. 1, the numeral 10 refers generally to an enclosed space from which the asbestos is to be removed. Enclosed space 10 is either defined by the walls of the building structure or by temporary walls. In either case, the walls are referred to generally by the reference numerals 12, 14, 16 and 18. The walls would normally be sealed with a plastic sheeting material to prevent the escape of fibers therefrom. In most projects, a clean room 20 is provided having an entrance 22. Door 24 connects clean room 20 with shower room 26. Door 28 connects shower room 26 with equipment room 30. Door 32 connects equipment room 30 with the enclosed space 10. Normally, doors 22, 24, 28 and 32 are comprised of a flexible plastic sheet material to permit the material to be pushed aside when passing therethrough.

Figure 2:
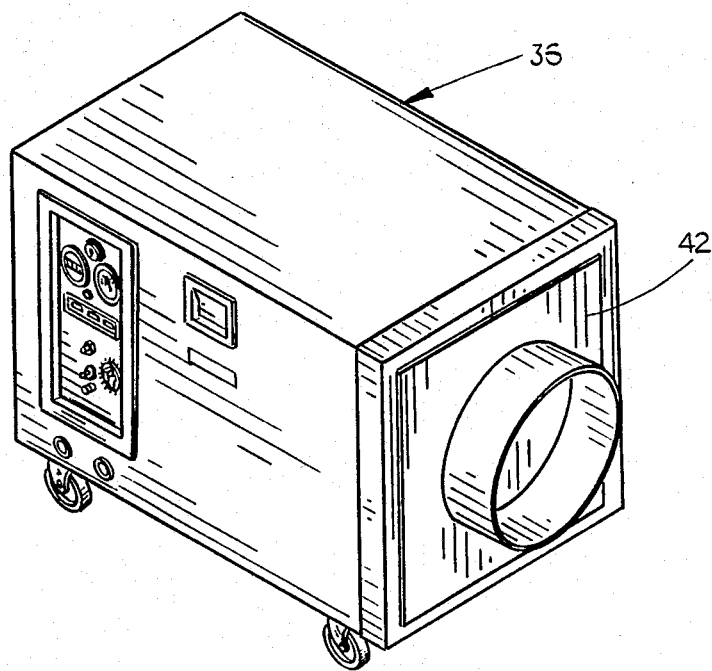
FIG. 2 is a perspective view of a prior art air filtration unit.
Figure 3:
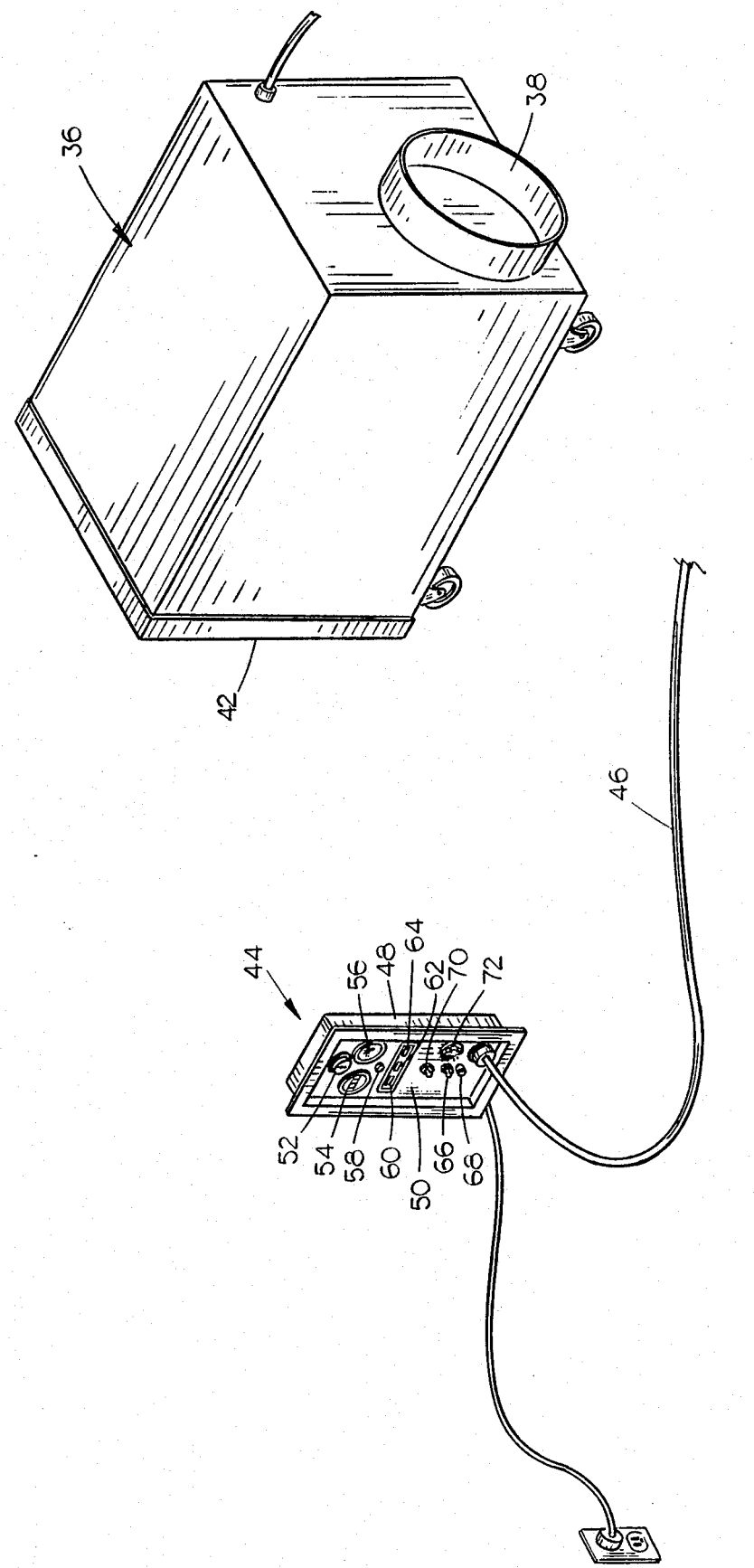
FIG. 3 is a perspective view of the remote control of this invention.

The numeral 36 refers to a conventional filtration unit such as that previously described except that the control and monitoring panel has been removed therefrom and is remotely located as will be described. A conventional filtration unit with the control and monitoring panel thereon is illustrated in FIG. 2. Filtration unit 36 includes an air outlet 38 which communicates with an opening 40 in wall 18 so that air being discharged from the filtration unit 36 will be discharged outwardly of the space 10. Filtration unit 36 also includes an air inlet 42. The structure described to this point is conventional. In the typical situation, the workmen could be working in any area within the space 10 and the removal of the asbestos in the space 10 could cause asbestos fibers to be airborne. The system is intended to draw the asbestos fibers into the air intake 42 of the filtration unit so that the asbestos fibers will be filtered from the air prior to the air being discharged from the contaminated space. In the system of the prior art, the filtration unit could only be monitored by a worker entering the enclosed space 10 through the clean room 20, shower room 26 and equipment room 30. Further, if the filtration unit 36 malfunctions and shuts down, a worker must also enter the enclosed space 10 to re-start the unit. To eliminate such an inconvenience and problem, a remote control and monitoring means 44 is located outwardly of the enclosed space 10 and is preferably positioned in the clean room 20. The remote control and monitoring means 44 is operatively connected to the filtration unit 36 by means of an extension cord assembly 46.

Remote control on monitoring means 44 includes a housing 48 having a front face 50 as seen in the drawings. Remote control and monitoring means 44 typically includes an audible alarm 52, elapsed time meter 54, filter pressure gauge 56, pressure port indicator 58, normal indicator light 60, clogged filter light 62, shutdown indicator light 64, on-off switch 66, fuse holder 68, re-start switch 70, and timer shut-down delay 72. It should be noted that the remote control and monitoring means 44 could include additional controls or could utilize fewer controls.

In the preferred embodiment, the remote contorl and monitoring means 44 is positioned as illustrated in FIG. 1 so that the housing 48 is positioned in the clean room 20 so that access may be had thereto without the necessity of entering the contaminated space.

Thus, filtration unit 36 may be controlled and monitored without the necessity of a worker having to enter the contaminated area 10 thereby eliminating the need for showering, changing clothes, etc.

Figure 4:
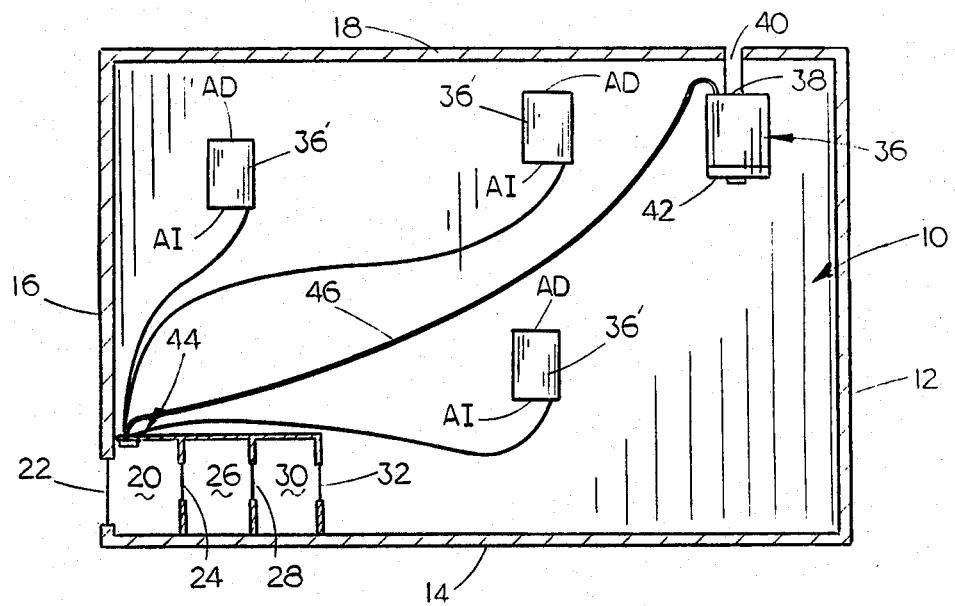
FIG. 4 is a floor plan illustrating a further use of the apparatus of this invention.

FIG. 4 is a schematic similar to FIG. 1 except that FIG. 4 illustrates a plurality of air filtration units 36' positioned in the contaminated area 10. Each of the filtration units 36' has an air intake aside AI and air discharge side AD. The air filtration units 36' are identical to the air filtration unit 36 except that the exhaust thereof simply exhausts to the interior of the enclosed contaminated space rather than through the exhaust opening 40. Even though the air filtration units 36' do not have their exhausts operatively connected to the opening 40, it is important that the air filtration units 36' can be controlled and monitored from outside the contaminated area for the same reasons that it is important to control and monitor the air filtration unit 36. Thus it can be seen that the invention accomplishes at least all of its stated objectives.

I claim:

1. A system for removing dangerous solid materials from an enclosed contaminated area within a building, said system comprising:

a wall means defining said enclosed contaminated area;

said enclosed contaminated area having at least one air inlet associated therewith to permit air to enter said enclosed contaminated area;

said wall means having at least one air outlet formed therein to permit air to exit said enclosed contaminated area;

a first air filtration unit located within said enclosed contaminated area;

said first air filtration unit having an air inlet in communication with said enclosed contaminated area;

said first air filtration unit having an air outlet in operative communication with the air outlet in said wall means;

said first air filtration unit including means for creating a reduced air pressure within said enclosed contaminated area for moving air through said filtration unit so that air will be drawn into said air inlet of said enclosed, contamination area, through said filtration unit, and thence through the air outlet in said wall means;

means for sealing said air inlet in the event that the reduced air pressure is lost in said enclosed contaminated area;

at least a second air filtration unit located within said enclosed contaminated area and having an air inlet and an air outlet in communication with said enclosed contaminated area, and remote control and monitoring means for controlling the operation of at least one of said first and second filtration units and for monitoring the operation of at least one of said first or second filtration units;

said remote control and monitoring means being located outside of said enclosed contamination area whereby the said filtration unit may be operated and monitored without entering said enclosed contaminated area.

* * * * *